(12) United States Patent
Hattori et al.

(10) Patent No.: US 9,227,386 B2
(45) Date of Patent: Jan. 5, 2016

(54) METHOD FOR MANUFACTURING RESIN-BASED COMPOSITE MATERIAL

(75) Inventors: Hidetaka Hattori, Tokyo (JP); Hideki Horizono, Tokyo (JP); Takaaki Sato, Tokyo (JP); Tadashi Yazaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 96 days.

(21) Appl. No.: 13/808,983

(22) PCT Filed: Jun. 3, 2011

(86) PCT No.: PCT/JP2011/062768
§ 371 (c)(1),
(2), (4) Date: Jan. 8, 2013

(87) PCT Pub. No.: WO2012/008235
PCT Pub. Date: Jan. 19, 2012

(65) Prior Publication Data
US 2013/0112335 A1 May 9, 2013

(30) Foreign Application Priority Data
Jul. 15, 2010 (JP) ................................ 2010-160910

(51) Int. Cl.
*B32B 37/10* (2006.01)
*B29C 43/12* (2006.01)
(Continued)

(52) U.S. Cl.
CPC ............ *B32B 37/1054* (2013.01); *B29C 43/12* (2013.01); *B29C 43/3642* (2013.01);
(Continued)

(58) Field of Classification Search
CPC .... B32B 37/10; B32B 37/1018; B29C 70/44; B29C 70/342; B29C 70/443
See application file for complete search history.

(56) References Cited

U.S. PATENT DOCUMENTS 4,216,047 A * 8/1980 Hilliard et al. ................ 156/285
4,357,193 A * 11/1982 McGann et al. .............. 156/286
(Continued)

FOREIGN PATENT DOCUMENTS

CN 101511568 A 8/2009
EP 1 175 991 A1 1/2002
(Continued)

OTHER PUBLICATIONS

Office Action issued May 20, 2014 in corresponding Chinese Application No. 201180031194.6 (with English translation).
(Continued)

*Primary Examiner* — Christopher Schatz
(74) *Attorney, Agent, or Firm* — Wenderoth, Lind & Ponack, L.L.P.

(57) ABSTRACT

A method for manufacturing a resin-based composite material includes: a stage in which prepregs are stacked on a jig; a stage in which the stacked prepregs and the jig are covered and pressurized heat treatment is applied thereto to form a first semi-molded article and a second semi-molded article; a stage in which board thicknesses of the first semi-molded article and the second semi-molded article are measured, a stage in which the number of additional plies is determined based on the measured board thicknesses, a desired board thickness of the resin-based composite material, and physical properties of the additional plies; and a stage in which a layered product is formed by stacking the predetermined number of additional plies between the first semi-molded article and the second semi-molded article, the layered product and the jig are covered with a bagging material, and pressurized heat treatment is applied thereto.

4 Claims, 5 Drawing Sheets

(51) Int. Cl.
*B29C 43/36* (2006.01)
*B29C 70/44* (2006.01)
*B29C 70/46* (2006.01)
B29C 43/20 (2006.01)
B29K 105/08 (2006.01)

(52) U.S. Cl.
CPC ............... *B29C70/44* (2013.01); *B29C 70/46* (2013.01); *B29C 43/203* (2013.01); *B29C 2043/3644* (2013.01); *B29K 2105/0872* (2013.01)

(56) References Cited

U.S. PATENT DOCUMENTS 5,116,216 A * 5/1992 Cochran et al. ............... 425/504
5,759,325 A 6/1998 Davis
6,000,453 A 12/1999 Davis

FOREIGN PATENT DOCUMENTS

| | | |
|---|---|---|
| JP | 4-18317 | 1/1992 |
| JP | 7-124972 | 5/1995 |
| JP | 2685554 | 12/1997 |
| JP | 2000-507517 | 6/2000 |
| RU | 1785910 | 1/1993 |
| RU | 2 116 886 C1 | 8/1998 |
| RU | 2 116 887 C1 | 8/1998 |
| RU | 2 185 285 C2 | 7/2002 |

OTHER PUBLICATIONS

Notice of Allowance issued Jan. 28, 2015 for Chinese Patent Application No. 201180031194.6 (in Chinese only).
International Search Report issued Aug. 2, 2011 in corresponding International Application No. PCT/JP2011/062768.
Written Opinion of the International Searching Authority issued Aug. 2, 2011 in corresponding International Application No. PCT/JP2011/062768.
Notice of Allowance issued Dec. 12, 2014, in corresponding Canadian Patent Application No. 2,804,586.
Decision to Grant a Patent issued on Dec. 24, 2014, for Japanese Patent Application No. 2010-160910.
Decision on patent grant for invention issued Jul. 7, 2014 in corresponding Russian Application No. 2012158094 (with English translation).

* cited by examiner

FIG. 4
(a)
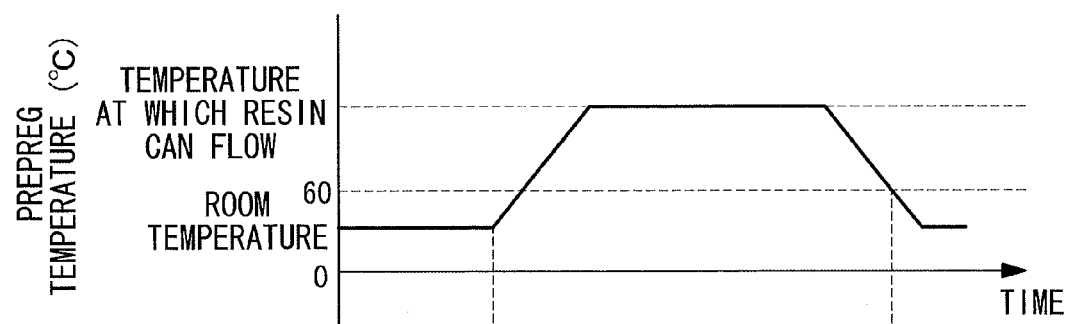
(b)
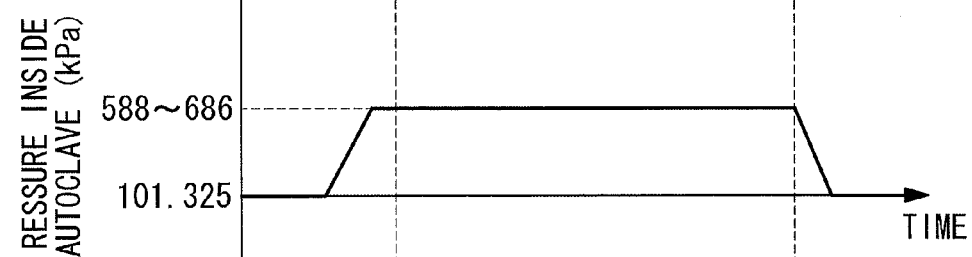
(c)
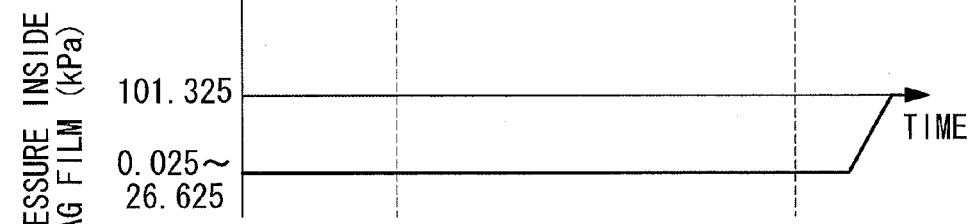

FIG. 5
(a)
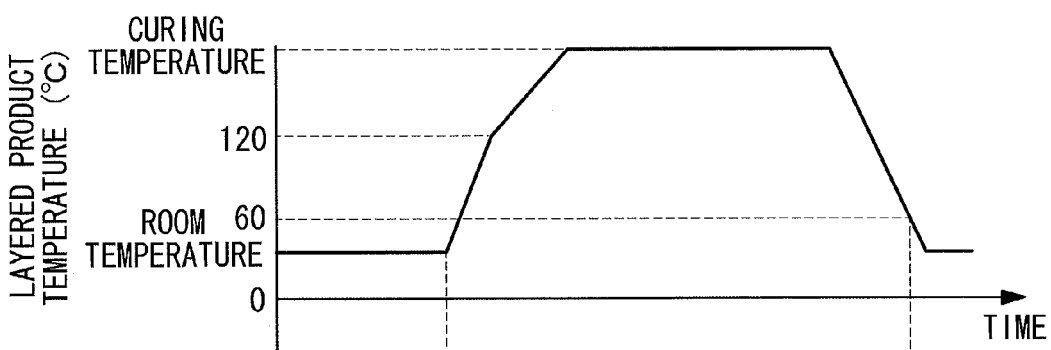
(b)
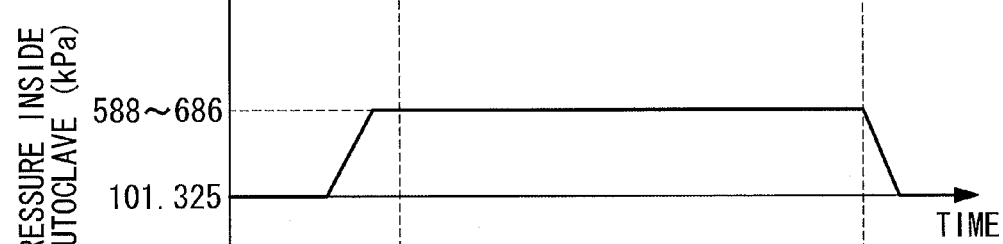
(c)
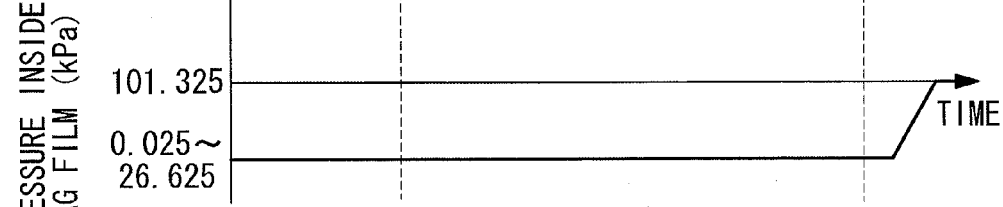

METHOD FOR MANUFACTURING RESIN-BASED COMPOSITE MATERIAL

TECHNICAL FIELD

The present invention relates to a method for manufacturing a resin-based composite material.

BACKGROUND ART

Resin-based composite materials, such as fiber-reinforced resins, are widely used for structural members of airplanes, automobiles, ships and the like for their light weight and high strength.

The resin-based composite materials are generally formed by stacking a plurality of prepregs which are made of fiber-reinforced resins and performing heating and pressurizing treatment thereon in an autoclave or the like.

For example, when the resin-based composite material is applied to rotor spars of a helicopter, the resin-based composite material is required to have sufficient strength to support a tensile load, which is generated by centrifugal force, and a rigid precision so that rotating blades can meet a designed natural frequency (dynamic behavior). It is known that the rigidity is proportional to the cube of board thickness of a member which is made of a resin-based composite material. Accordingly, in order to realize the rotor spars made of resin-based composite materials, it is necessary to minimize variations in board thickness with respect to a designed value (e.g., ±2% or less).

However, the resin-based composite material cured in an autoclave may possibly have a variation in board thickness larger than the above-stated desired variation value due to such causes as variations in board thickness of a prepreg itself, variations in resin fluidity during heating and a loss of the resin related thereto, variations in stacking process, and presence of air space remaining between layers. Accordingly, there is a need for a fabrication method capable of strictly controlling the board thickness of the resin-based composite material.

Patent Literature 1 discloses a method for fabricating a composite material by laying up (stacking) a plurality of prepreg plies in sequence on a molding surface of a base-mold member. In Patent Literature 1, the composite material is fabricated by repeating: a step of laying up a predetermined number of prepregs; a step of performing autoclave compression on the prepregs at about room temperature; and a step of laying up an auxiliary ply pack on an autoclaved layered product to adjust fluctuations in board thickness.

CITATION LIST

Patent Literature

{PTL 1}

Japanese Translation of PCT International Application, Publication No. 2000-507517 (claim 1, P. 14, l. 13 to P. 23, l. 4, and FIG. 3)

SUMMARY OF INVENTION

Technical Problem

In the fabrication method in Patent Literature 1, compression of the prepregs is performed for each of the predetermined number of prepregs at room temperature. This causes outflow of resin during final heating and pressurizing treatment, as a result of which the board thickness is easily changed.

An object of the present invention is to provide a manufacturing method capable of controlling the board thickness of a resin-based composite material with higher precision.

Solution to Problem

In order to accomplish the above object, the present invention provides a method for manufacturing a resin-based composite material, comprising: a prepreg stacking stage in which prepregs made of fiber-reinforced resin are stacked on a jig of a predetermined shape until the prepregs have a predetermined thickness; a hot-compacting stage in which the stacked prepregs and the jig are covered with a bagging material, and the bagging material is heat-treated under pressure to form a first semi-molded article and a second semi-molded article; a board thickness measurement stage in which board thicknesses of the first semi-molded article and the second semi-molded article are measured; a number of additional plies determination stage in which the number of additional plies is determined based on the measured board thicknesses, a desired board thickness of the resin-based composite material, and physical properties of the additional plies; and a bonding stage in which a layered product is formed by stacking the determined number of additional plies between the first semi-molded article and the second semi-molded article which are placed on the jig of the predetermined shape, the layered product and the jig are covered with a bagging material, and the bagging material is heat-treated under pressure.

For the resin-based composite material of the present invention, the first semi-molded article and the second semi-molded article are produced by placing prepregs in the jig of the desired shape and applying pressurized heat treatment to the prepregs stored in the jig. Accordingly, at the stage of the semi-molded articles which are half-finished products, the variations in board thickness with respect to a design value can be suppressed. Further, a layered product is formed by placing additional plies between the first semi-molded article and the second semi-molded article. The layered product is then subjected to pressurized heat treatment to produce a resin-based composite material as a product. In this case, the number of additional plies is determined in consideration of the board thicknesses of the first semi-molded article and the second semi-molded article, the desired board thickness of the resin-based composite material, and the physical properties of additional plies. This makes it possible to control the board thickness of the resin-based composite material with sufficient precision.

Moreover, the resin-based composite material in the present invention is manufactured by using the jig of a predetermined shape, which provides an advantage that adjustment of component width by machining and the like is not needed.

In the aforementioned invention, it is preferable that the jig includes a bottom jig and a side jig and that a resin leakage preventing material is placed on a contact surface between the bottom jig and the side jig.

In the present invention, the jig including the bottom jig and the side jig is used in order to obtain the resin-based composite material of a desired shape. In this regard, when pressurized heat treatment is applied to the prepregs for producing semi-molded articles, resin may flow out from the contact surface between the jigs and may influence fluctuations in board thickness. In the present invention, a resin leakage preventing material is placed on the contact surface between the bottom jig and the side jig to prevent the outflow of the resin. Therefore, it becomes possible to enhance the precision of controlling the board thickness.

In the aforementioned invention, at least in either one of the semi-molded article formation stage and the bonding stage, the bagging material is preferably heat-treated while an inside of the bagging material is maintained in reduced-pressure atmosphere.

Generally, when pressurized heat treatment is applied to the prepregs, the pressure inside the bagging material is reduced and the bagging material is pressurized from the outside. The inside of the bagging material is then released to the atmosphere before temperature increases. However, in the present invention, since the jig is used, the air remaining between layers may not be discharged to the outside at the time of the pressurized heat treatment, or air may flow backward at the time of the atmosphere release. As a result, air may remain inside the resin-based composite material. Air pockets (micro voids) remaining between layers cause degraded strength of the resin-based composite material. Particularly in the bonding stage, which is a stage of bonding cured semi-molded articles, the atmosphere release tends to cause generation of air pockets between the semi-molded article and the additional plies.

In the present invention, the inside of the bagging material is put in reduced-pressure atmosphere before heat treatment is performed. This makes it possible to promote discharge of air between layers.

In this case, air discharge means is preferably placed on a cross section of the stacked prepregs or the layered product.

The jig is used in the present invention. Accordingly, it is advisable to place the air discharge means on a lateral surface of the layered product, which is constituted of prepregs or semi-molded articles and additional plies, so that a route is secured to discharge the air between layers to the outside.

Advantageous Effects of Invention

According to the present invention, it becomes possible to control the board thickness of the resin-based composite material with high precision. It also becomes possible to suppress generation of micro voids between layers and to thereby prevent the strength of the resin-based composite material from degrading.

Since the resin-based composite material is produced by using a predetermined jig in the present invention, such stages as machining of component width can advantageously be omitted.

BRIEF DESCRIPTION OF DRAWINGS

FIG. 4 shows a graph view for explaining temperature conditions and pressure conditions in the semi-molded article formation stage.
FIG. 5 shows a graph view for explaining temperature conditions and pressure conditions in the bonding stage.

DESCRIPTION OF EMBODIMENTS

One embodiment of a method for manufacturing a resin-based composite material according to the present invention will be described with reference to the drawings.

Figure 1:
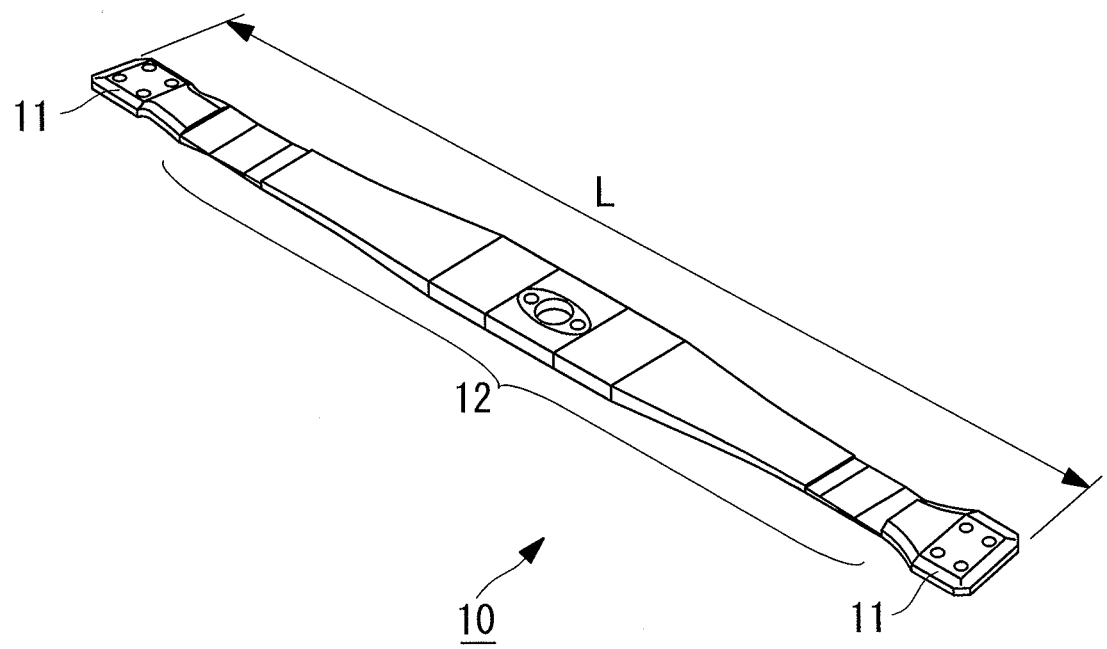
FIG. 1 is a bird's-eye view of a rotor spar of a helicopter.
Figure 2:
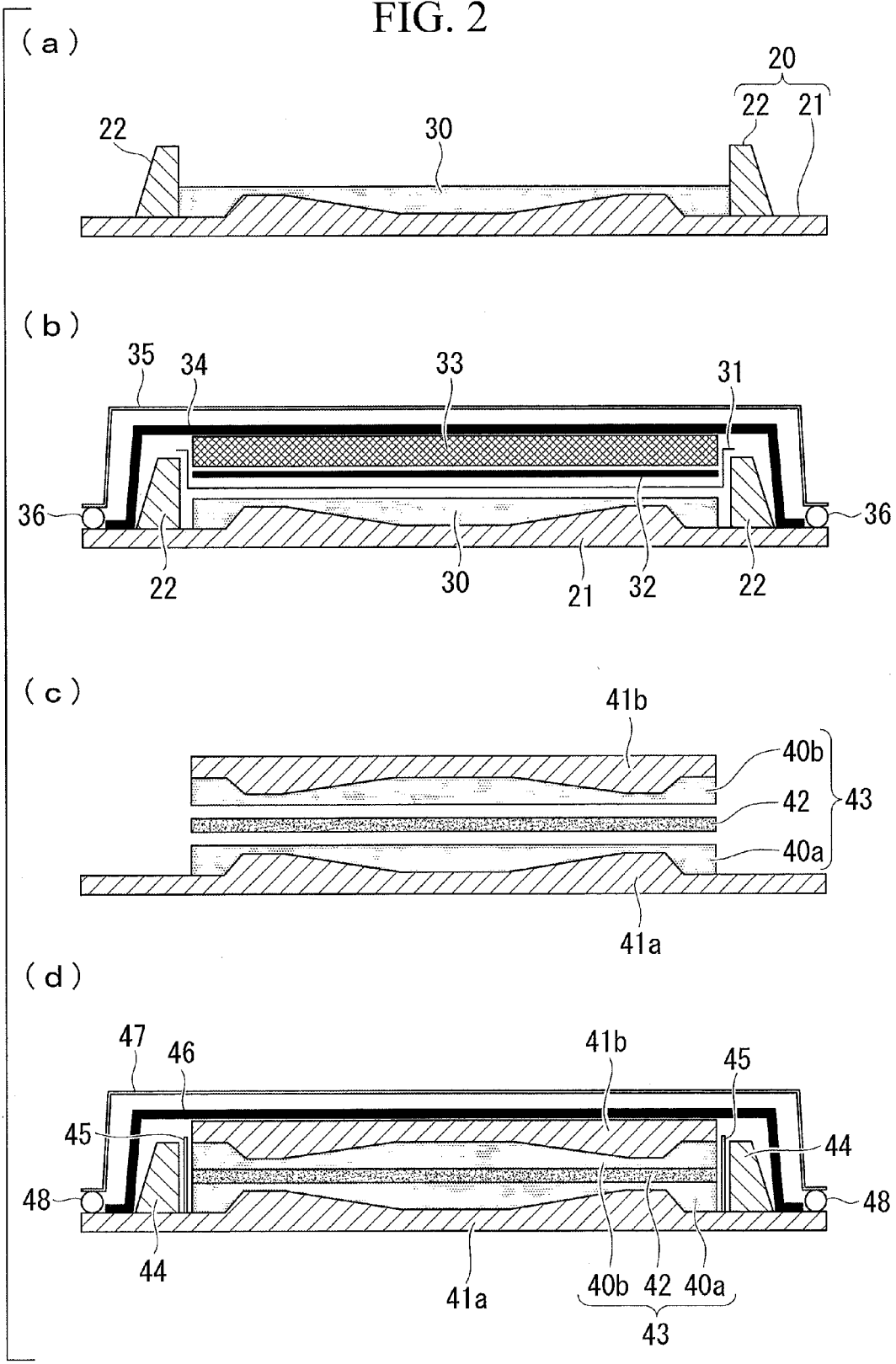
FIG. 2 is a schematic view for explaining a method for manufacturing a resin-based composite material of the present invention.

FIG. 1 is a bird's-eye view of a rotor spar of a helicopter produced by using a resin-based composite material. The rotor spar 10 is constituted from a fiber-reinforced resin board. Examples of the fiber-reinforced resin board include glass-fiber reinforced plastics and carbon fiber reinforced plastics.

The method for manufacturing the resin-based composite material of the present embodiment is described with reference to FIG. 2 through FIG. 5.

The method for manufacturing the resin-based composite material of the present embodiment includes a prepreg stacking stage, a semi-molded article formation stage, a board thickness measurement stage, a number of additional plies determination stage, and a bonding stage.

(1) Prepreg Stacking Stage (FIG. 2(a))

Figure 3:
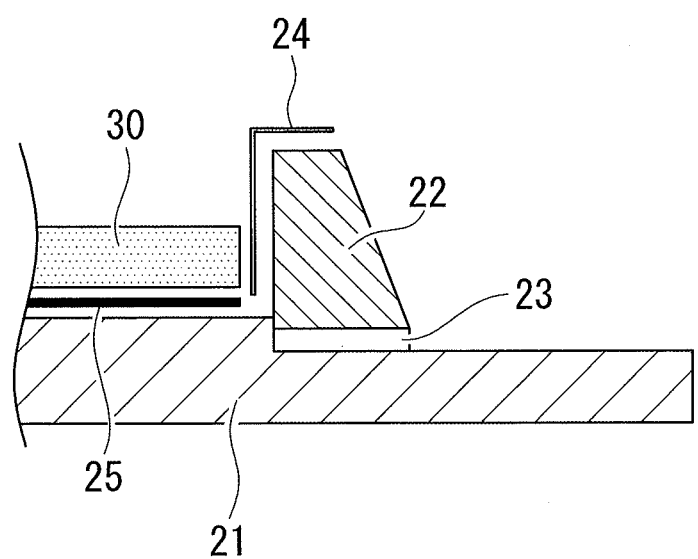
FIG. 3 is a schematic view for explaining the method for manufacturing the resin-based composite material of the present invention.

A prepreg 30 made of fiber-reinforced resin is stacked on the inside of a jig 20. The jig 20 includes a bottom jig 21 and a side jig 22. The side jig 22 is placed so as to surround the periphery of the prepreg. The jig 20 is made identical to the surface shape of a final product (e.g., the rotor spar 10 in FIG. 1). As shown in FIG. 3, it is preferable to place a silicone sheet 23 as a resin leakage preventing material on a contact surface between the bottom jig 21 and the side jig 22. Examples of the resin leakage preventing material may include curable silicone resins and high-temperature greases in addition to silicones.

As shown in FIG. 3, a peel ply 24 may be placed as an air discharge means on the surface of the side jig 22 which is in contact with the prepreg 30. Examples of the air discharge means may include not only fabrics such as peel plies but also Teflon (registered trademark) coated release fabrics and perforated films.

On the surface of the bottom jig 21 which is in contact with the prepreg 30, a FEP (tetrafluoroethylene/hexafluoride-propylene copolymer resin) film may be placed as a release sheet 25. Here, the release sheet 25 may be fixed with spray pastes and the like.

The prepreg 30 is properly cut so as to be matched to an inside shape of the jig 20, and is placed and stacked inside the jig 20.

In this stage, the number of prepregs to be stacked in each part is determined so that a thickness t of a semi-molded article, which is obtained in the semi-molded article formation stage, satisfies Formula (1) in consideration of the number and thickness of additional plies for use in the subsequent stages.

$$t = (T - d \times n)/2 \tag{1}$$

where T represents a board thickness design value of the rotor spar, d represents a thickness of one additional ply after curing, and n represents an assumed number of additional plies (n is an integer of 1 or more).

In accordance to the strength required of each part, the prepregs are placed inside the jig so that the fiber thereof has predetermined orientation. When a plurality of prepregs are stacked in a mounting section 11 positioned at both ends of the rotor spar 10 in FIG. 1, the prepregs are placed so that each prepreg fiber has an orientation direction of 0°, 45°, and 90° with respect to a longitudinal direction of the rotor spar (a direction L in FIG. 1). The stacking order and the stacking number of prepregs in each orientation direction are properly determined in accordance to the strength demanded. In a shaft section 12 of the rotor spar, the prepregs are placed and stacked so that the fiber has mainly an orientation direction of 0° with respect to the longitudinal direction L.

(2) Semi-Molded Article Formation Stage (FIG. 2(b))

Hot compaction processing is applied to the prepregs 30 stacked inside the jig 20 so that the layers of the prepregs 30 are heat-bonded to each other.

A peel ply 31 and a release sheet (FEP film) 32 are placed on the prepregs 30. The release sheet 32 may be fixed with spray pastes and the like. A mold (pressure plate) 33 with a smooth surface is placed on the prepregs 30.

As shown in FIG. 2(b), an upper surface of the bottom jig 21, the side jig 22, and the pressure plate 33 are covered with a breather cloth 34 and a bagging film (bagging material) 35. The Bagging film 35 is fixed onto the bottom jig 21 with a sealant tape 36.

FIG. 4 is a graph view for explaining temperature conditions and pressure conditions during hot compaction processing in the semi-molded article formation stage. FIG. 4(a) shows prepreg temperature, FIG. 4(b) shows pressure inside an autoclave, and FIG. 4(c) shows pressure inside the bagging film.

Air inside an area covered with the bagging film 35 is exhausted through a deaeration circuit (not shown) provided between the bagging film 35 and the bottom jig 21. In this case, the inside of the bag film is in reduced-pressure atmosphere having pressure generally in the range from −101.3 kPa to −74.7 kPa (i.e., from 0.025 kPa to 26.625 kPa) with respect to atmospheric pressure (101.325 kPa) (see FIG. 4(c)).

The jig 20 having the pressure inside the bagging film 35 being reduced is brought into an autoclave. The inside of the autoclave is pressurized to the range from about 588 kPa to 686 kPa while the inside of the bag film 35 is in reduced-pressure state (see FIG. 4(b)).

Once the inside of the autoclave is stabilized at the above pressure, the temperature inside the autoclave (prepregs) is increased from room temperature to the temperature range where resin can flow (see FIG. 4(a)). For example, in the case where the prepregs for use are made of epoxy resin curable at 180° C., the temperature is increased to the range from 95° C. to 100° C. A heating rate is 3° C./minute or less. Keeping the heating rate in the above-mentioned range makes it possible to secure the uniformity in temperature of the entire prepregs. In consideration of the time required for the semi-molded article formation stage, the heating rate should preferably be 1° C./minute or more.

Once resin softening temperature is reached, the inside of the autoclave is retained on the condition of 4 hours to 6 hours. After the retention, the temperature inside the autoclave is lowered at a temperature falling rate of 3° C./minute or less. In consideration of the time required for the semi-molded article formation stage, the temperature falling rate should preferably be 1° C./minute or more. At the time when the temperature inside the autoclave reaches 60° C., the inside of the autoclave is opened (i.e., the pressure thereof is reduced to atmospheric pressure). At the time when the temperature inside the autoclave is stabilized or becomes 50° C. or less, the pressure inside the bag film is reduced to atmospheric pressure.

Through this stage, a semi-molded article is obtained in which the layers of the prepregs are bonded by pressure and heat.

In the present embodiment, two or more semi-molded articles are produced for one resin-based composite material product.

In the present embodiment, the silicone sheet is placed between the bottom jig and the side jig, so that resin does not flow out to the outside of the jig during hot compaction processing. The hot compaction processing is performed in the temperature range where resin can flow, so that the prepregs are integrated to have a stable shape. Therefore, at the stage of the semi-molded article, fluctuations in board thickness with respect to a design value are suppressed.

Moreover, the peel ply is placed on the lateral surface of the prepregs to maintain the inside of the bagging film at a vacuum, and hot compaction processing is performed in this condition. As a result, air which pools between layers is discharged to the outside during the processing, and thereby generation of air pockets between layers is suppressed.

(3) Board Thickness Measurement Stage

Board thicknesses in specified portions of the semi-molded article are measured. The board thickness may be measured after the semi-molded article is released from the jig, or may be measured while being placed inside the jig.

The board thickness in each part of the semi-molded article obtained by the above-stated prepreg stacking stage and the semi-molded article formation stage has variations of about ±5% with respect to Formula (1).

(4) Number of Additional Plies Determination Stage

In consideration of the board thickness in each part of the semi-molded article measured by the board thickness measurement stage, a board thickness design value of the resin-based composite material product, and physical properties of additional plies, the number of additional plies (n in Formula (1)) is determined. In short, it is ensured that one or more additional plies are selected in this stage.

The physical properties of the additional plies include materials of the additional plies (e.g., type of resin), and thickness fluctuations in the case where the plies cure at various temperature. In this stage, it is advisable to make a database of the physical properties of additional plies in advance, so that the additional plies can appropriately be selected according to the specifications of products.

(5) Bonding Stage (FIGS. 2(c) and 2(d))

As shown in FIG. 2(c), a determined number of additional plies 42 are stacked on a flat surface (a surface having the pressure sheet laid thereon in the semi-molded article formation stage) of one semi-molded article 40a placed inside a jig 41a which is similar in shape to the jig used in the prepreg stacking stage. Another semi-molded article 40b placed inside a jig 41b which is similar in shape to the jig used in the prepreg stacking stage is placed so that a flat surface thereof is in contact with an upper surface of the additional ply 42. Thus, a layered product 43 is formed.

As shown in FIG. 2(d), a side jig 44 is placed on the lateral surface of the layered product 43. It is preferable to place a peel ply 45 on the surface where the layered product 43 is in contact with the side jig 44.

An upper surface of the jig 41a, the jig 41b, and the side jig 44 are covered with a breather cloth 46 and a bagging film 47. The bagging film 47 is fixed onto the jig 41a with a sealant tape 48.

FIG. 5 is a graph view showing an example of temperature conditions and pressure conditions in pressurized heat treatment in the bonding stage. FIG. 5(a) shows temperature of a layered product, FIG. 5(b) shows pressure inside an autoclave, and FIG. 5(c) shows pressure inside a bagging film.

The inside of an area covered with the bag film 47 is exhausted through a deaeration circuit (not shown) provided between the bagging film 47 and the jig 41a. In this case, the inside of the bagging film is in reduced-pressure atmosphere having pressure generally in the range from −101.3 kPa to −74.7 kPa (i.e., from 0.025 kPa to 26.625 kPa) with respect to atmospheric pressure (101.325 kPa) (see FIG. 5(c)).

The jig having the pressure inside the bagging film 47 being reduced is brought into an autoclave. The inside of the autoclave is pressurized while the pressure inside the bag film 47 is in a reduced state (see FIG. 5(b)).

After the inside of the autoclave is pressurized to and stable at about 588 kPa to 686 kPa, the temperature inside the autoclave (layered product) is increased from room temperature to resin curing temperature. For example, in the case where the prepregs for use are made of epoxy resin curable at 180° C., the temperature is increased to the range from 175° C. to 180° C. In FIG. 5(a), the heating rate is set with two stages. In the stage from room temperature to 120° C., the heating rate is 3° C./minute or less, and in the stage from 120° C. to resin curing temperature, the heating rate is 0.5° C./minute or less. Under such heating conditions, efficient production and homogeneity of products can be achieved. The heating rate may be constant until the curing temperature. When the heating rate is constant, it suffices to set the rate at 0.5° C./minute or less. In consideration of the time required for the bonding stage, the heating rate should preferably be 0.25° C./minute or more.

Once the curing temperature is reached, the inside of the autoclave is retained on the condition of 2 hours to 2.5 hours. After the retention, the temperature inside the autoclave is lowered at a temperature falling rate of 3° C./minute or less. In consideration of the time required for bonding stage, the temperature falling rate should preferably be 1° C./minute or more. At the time when the temperature inside the autoclave reaches 60° C., the autoclave is opened and the inside pressure thereof is reduced to atmospheric pressure. At the time when the temperature inside the autoclave is stabilized or becomes 50° C. or less, the pressure inside the bagging film is reduced to atmospheric pressure.

After the jig is taken out of the autoclave, the resin-based composite material is released from the jig.

For example, in the case of manufacturing a component member such as the rotor spar in which the mounting section 11 on both the ends is in a torsional relation with the shaft section 12, cured semi-molded articles and additional plies are stacked and subjected to autoclave processing. Accordingly, bonding surfaces between the semi-molded articles and the additional plies in the torsion section (e.g., the mounting section of the rotor spar) easily generate air pockets due to difference in shape between the bonding surfaces. With the presence of the torsion section, gaps may be produced between the jigs and the semi-molded articles, which may cause application of insufficient pressure onto the torsion section. Because of these conditions, air pockets are easily generated between the bonding surfaces and thereby the strength of the resin-based composite material is degraded. In this stage, the pressurized heat treatment is performed with the peel ply placed on the lateral surface of the layered product as described before, so that the structure is implemented which helps discharge of the air between the bonding surfaces. Accordingly, it becomes possible to suppress generation of micro voids and to thereby enhance the quality of the resin-based composite material.

REFERENCE SIGNS LIST

10 Rotor spar
11 Mounting section
12 Shaft section
20, 41a, 41b Jig
21 Bottom jig
22, 44 Side jig
23 Silicone sheet
24, 31, 45 Peel ply
25, 32 Release sheet
30 Prepreg
33 Pressure plate
34, 46 Breather cloth
35, 47 Bagging film (bagging material)
36, 48 Sealant tape
40a, 40b Semi-molded article
42 Additional ply
43 Layered product

The invention claimed is:

1. A method for manufacturing a resin-based composite material, comprising:
   a prepreg stacking stage in which prepregs made of fiber-reinforced resin are stacked on a jig of a predetermined shape until the prepregs have a predetermined thickness;
   a first semi-molded article formation stage in which the stacked prepregs and the jig are covered with a first bagging material and the first bagging material is heat-treated under pressure until a temperature is increased to a range where the resin can flow to form a first semi-molded article;
   a second semi-molded article formation stage in which
   prepregs made of fiber-reinforced resin are stacked on another jig of a predetermined shape until the prepregs have a predetermined thickness,
   the stacked prepregs and the another jig are covered with another bagging material separately from the first semi-molded article, and
   the another bagging material is heat-treated under pressure until a temperature is increased within a range where the resin can flow to form a second semi-molded article by performing the same steps as the first semi-molded article formation stage;
   a board thickness measurement stage in which a board thickness of the first semi-molded article and a board thickness of the second semi-molded article are measured;
   a number of additional plies determination stage in which the number of additional plies is determined based on the measured board thickness of the first semi-molded article
   the measured board thickness of the second semi-molded article, a desired board thickness of the resin-based composite material, and physical properties of the additional plies; and
   a bonding stage in which
   a layered product is formed by stacking the determined number of additional plies between the first semi-molded article and the second semi-molded article which are placed on the jig of the predetermined shape and the another ii~ of the predetermined shape, respectively, the layered product and the jig are covered with a second bagging material, and temperature to bond the first semi-molded article, the second semi-molded article, and the additional plies between the first semi-molded article and the second semi-molded article.

2. The method for manufacturing the resin-based composite material according to claim 1, wherein
   the jig includes a bottom jig and a side jig, and
   a resin leakage preventing material is placed on a contact surface between the bottom jig and the side jig.

3. The method for manufacturing the resin-based composite material according to claim 1, wherein in at least one of the first semi-molded article formation stage, the second semi-molded article formation stage, and the bonding stage, the first bagging material, the another bagging material and the second bagging material are heat-treated while insides of the first bagging material, the another bagging material and the second bagging material are maintained in reduced-pressure atmosphere.

4. The method for manufacturing the resin-based composite material according to claim 3, wherein an air discharge member is placed on a cross section of the stacked prepregs of the first semi-molded article or second semi-molded article or the layered product.

* * * * *